(12) United States Patent
Zhang et al.

(10) Patent No.: US 11,374,449 B2
(45) Date of Patent: Jun. 28, 2022

(54) PERMANENT-MAGNET SPINDLE MOTOR

(71) Applicant: HIWIN MIKROSYSTEM CORP., Taichung (TW)

(72) Inventors: Zhe-Wei Zhang, Taichung (TW); Ruei-Bin Hsiao, Taichung (TW)

(73) Assignee: HIWIN MIKROSYSTEM CORP., Taichung (TW)

( * ) Notice: Subject to any disclaimer, the term of this patent is extended or adjusted under 35 U.S.C. 154(b) by 198 days.

(21) Appl. No.: 16/737,616

(22) Filed: Jan. 8, 2020

(65) Prior Publication Data

US 2021/0211005 A1 Jul. 8, 2021

(51) Int. Cl.
*H02K 1/27* (2022.01)
*H02K 21/14* (2006.01)
*H02K 1/276* (2022.01)

(52) U.S. Cl.
CPC .......... *H02K 1/2766* (2013.01); *H02K 21/14* (2013.01)

(58) Field of Classification Search
CPC ...... H02K 1/2766; H02K 21/14; H02K 1/276; H02K 2213/03
USPC .................................................. 310/156.56
See application file for complete search history.

(56) References Cited

U.S. PATENT DOCUMENTS

| | | | | |
|---|---|---|---|---|
| 2007/0126304 A1* | 6/2007 | Ito | ........................ | H02K 1/2766 310/156.53 |
| 2013/0119807 A1* | 5/2013 | Nakada | ................ | H02K 1/2706 310/156.38 |
| 2013/0119817 A1* | 5/2013 | Arimatsu | ................ | H02K 1/276 310/216.074 |
| 2013/0140933 A1* | 6/2013 | Katsuhisa | .............. | H02K 1/276 310/156.08 |
| 2014/0091663 A1* | 4/2014 | Hazeyama | ........... | H02K 1/2766 310/156.11 |
| 2017/0288482 A1* | 10/2017 | Suzuki | ................. | H02K 21/046 |
| 2018/0205274 A1* | 7/2018 | Heo | ........................ | H02K 1/24 |

* cited by examiner

*Primary Examiner* — Alex W Mok
(74) *Attorney, Agent, or Firm* — Guice Patents PLLC

(57) ABSTRACT

A permanent-magnet spindle motor includes a rotor in which a plurality of magnet units have a specific spatial configuration that results in a concentrated magnetic flux and consequently a high rotation speed. Each magnet unit has two first magnets and two magnetic barrier spaces, wherein the first magnets are provided in the tubular rotating shaft of the rotor mirror-symmetrically with respect to an axis of mirror symmetry defined by a diameter of the rotating shaft, and wherein each of the magnetic barrier spaces is formed as a hole, penetrates the rotating shaft along the axial direction thereof, is open at the two axial ends of the rotating shaft, is located between the outer periphery of the rotating shaft and one of the first magnets, and is adjacent to the distal end (with respect to the axis of mirror symmetry) of the one of the first magnets.

13 Claims, 5 Drawing Sheets

PERMANENT-MAGNET SPINDLE MOTOR

BACKGROUND OF THE INVENTION

1. Technical Field

The present invention relates to a motor and more particularly to a spindle motor with permanent magnets.

2. Description of Related Art

In order for a machine tool to carry out high-precision machining, it is important that the spindle of the machine tool have high rotational precision, high rotation speed, a large constant power speed ratio (CPSR), high rigidity, low temperature, and high reliability. While many a factor contributes to whether a spindle has the foregoing properties, it is indisputable that the power source for spindle rotation, i.e., the spindle motor, plays a critical role.

Compared with induction motors, permanent-magnet motors have larger CPSRs, higher efficiency, and larger output torques at a low rotation speed and can therefore better adapt the spindle of a machine tool for high-speed and high-precision machining. As the torque properties of a spindle motor have a huge impact on the rotation state of the spindle driven by the motor (e.g., the magnitude of torque ripple may affect the lay produced by the associated machine tool; the magnitude of torque, whether the machine tool can be used for heavy cutting; and the rotation speed of the spindle motor, the machining efficiency of the machine tool), the differences made by the output properties of different spindle motors in spindle rotation have been a prominent issue in the machine tool industry. Even if a spindle motor is different from another only slightly, the subtle differences may lead to markedly different results in machine tool applications.

BRIEF SUMMARY OF THE INVENTION

The primary objective of the present invention is to provide a permanent-magnet spindle motor that has a large CPSR and can enhance the work efficiency of a machine tool.

To achieve the above objective, the present invention provides a permanent-magnet spindle motor in which a plurality of magnet units are provided in the rotor and have a specific spatial configuration that produces a concentrated magnetic flux conducive to high rotation speed. More specifically, each magnet unit has two first magnets and two magnetic barrier spaces, wherein the two first magnets are provided in the tubular rotating shaft of the rotor in a mirror-symmetrical manner with respect to an axis of mirror symmetry defined by a diameter of the rotating shaft, and wherein each of the two magnetic barrier spaces is a hole penetrating the rotating shaft along the axial direction thereof, is open at the two axial ends of the rotating shaft, is located between the outer periphery of the rotating shaft and one of the two first magnets, and is adjacent to the distal end (with respect to the axis of mirror symmetry) of the one of the two first magnets.

In each magnet unit, each of the two first magnets has a strip-like configuration in a radial cross section of the rotating shaft, and the longitudinal axis of the strip-like configuration of each first magnet and the axis of mirror symmetry form an acute angle toward the center of the rotating shaft.

Each magnet unit further includes a second magnet buried in the rotating shaft and located between the two first magnets of the magnet unit.

In each magnet unit, the center of the second magnet lies on the axis of mirror symmetry, and the length of the second magnet is smaller than the length of each first magnet.

The ratio of the inner diameter of the rotating shaft to the outer diameter of the rotating shaft is 0.6:1~0.8:1 so that the spindle motor can drive a large-diameter machine tool spindle.

DETAILED DESCRIPTION OF THE INVENTION

Figure 1:
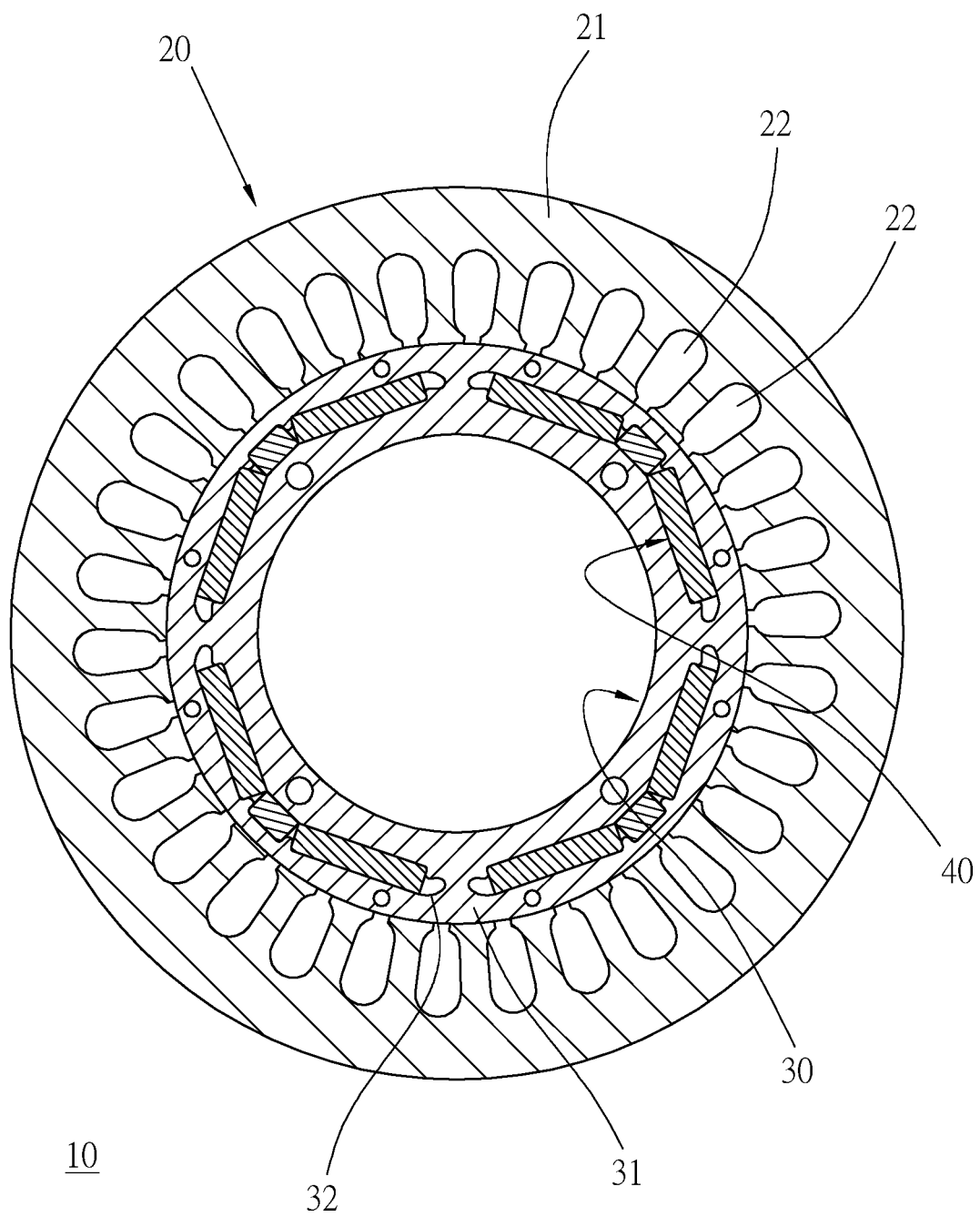
FIG. 1 is a plan view of a preferred embodiment of the present invention.
Figure 2:
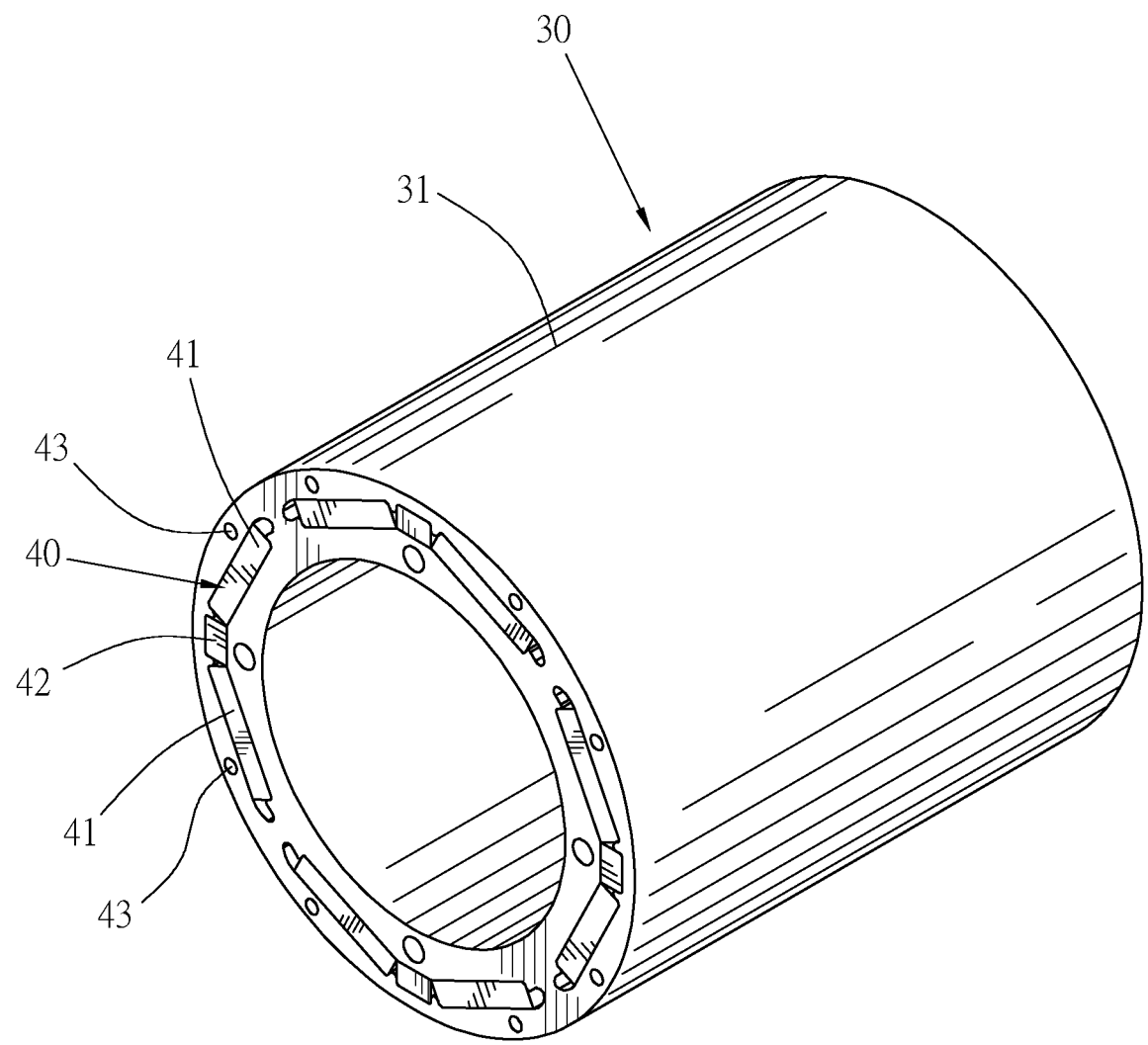
FIG. 2 is a perspective view of the rotor and the magnet units of the preferred embodiment in FIG. 1.
Figure 3:
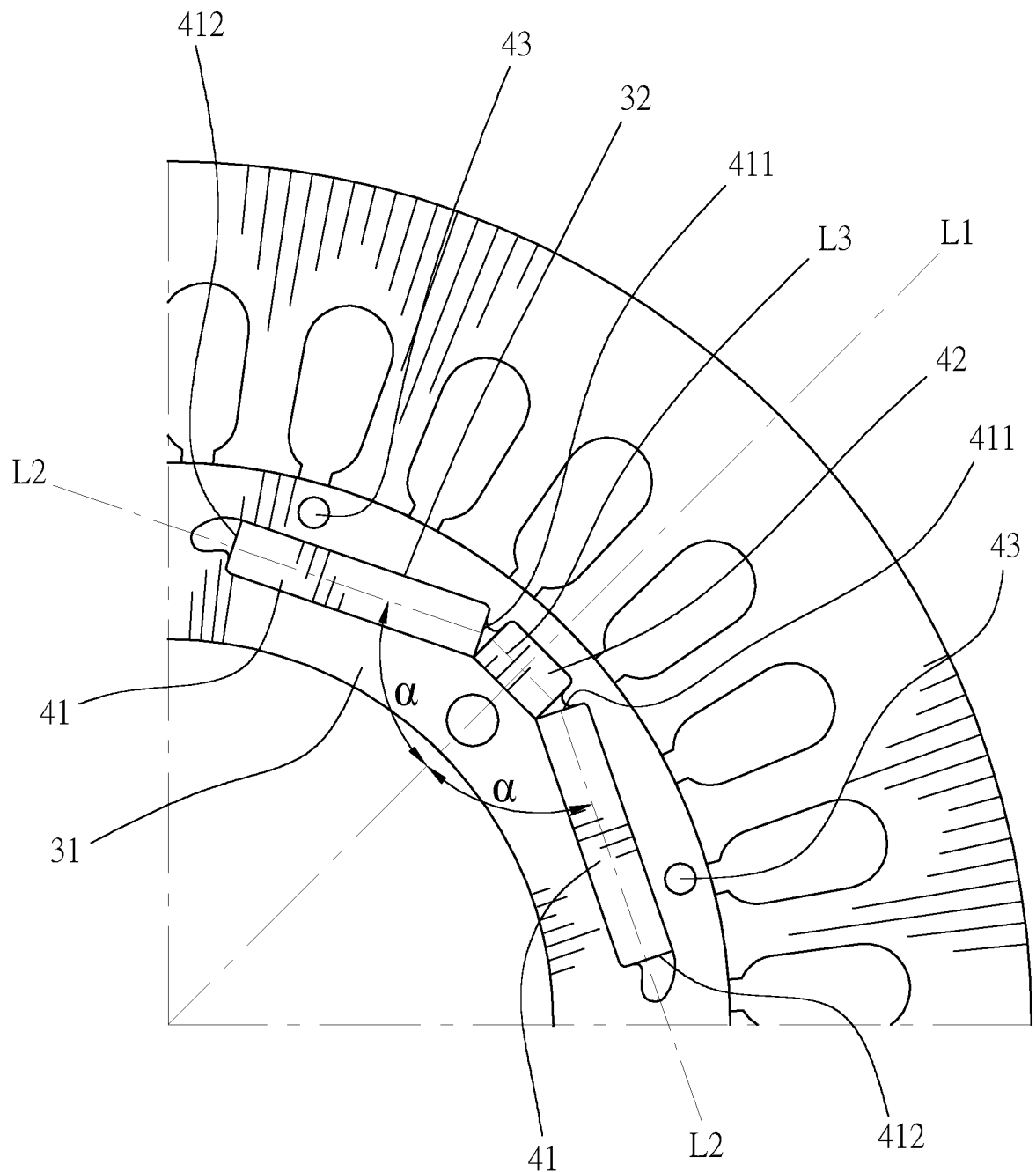
FIG. 3 is a partial plan view of the preferred embodiment in FIG. 1.

Referring to FIG. 1 to FIG. 3, the permanent-magnet spindle motor 10 according to a preferred embodiment of the present invention essentially includes a stator 20, a rotor 30, and a plurality of magnet units 40.

The stator 20 has an annular stator body 21. A plurality of stator slots 22 are concavely provided in the inner periphery of the stator body 21 in a radial fashion and serve as winding receiving spaces, wherein the windings are preferably wound in a distributed manner.

The rotor 30 has a rotating shaft 31 and as many receiving spaces 32 as the magnet units 40. The rotating shaft 31 is in the shape of a straight tube, and the inner diameter of the rotating shaft 31 is 0.6 to 0.8 times as large as the outer diameter of the rotating shaft 31 such that the thickness of the tube wall is smaller than the radius of the tube hole. The receiving spaces 32, each formed as a single hole, are arranged at equal intervals along the circumference of the rotating shaft 31, penetrate the rotating shaft 31 linearly along the axial direction of the rotating shaft 31, are each open at the two axial ends of the rotating shaft 31, and each have a bent strip-like configuration in a radial cross section of the rotating shaft 31.

Each magnet unit 40 has two first magnets 41, a second magnet 42, and two magnetic barrier spaces 43. The first magnets 41 and the second magnet 42 of each magnet unit 40 are fitted into the corresponding receiving space 32 and thereby buried in the rotating shaft 31. More specifically, each magnet unit 40 is so designed that the first magnets 41 are buried in the rotating shaft 31 mirror-symmetrically with respect to an axis of mirror symmetry L1 defined by a diameter of the rotating shaft 31; that the ends of the first magnets 41 that are respectively adjacent to the axis of mirror symmetry L1 (hereinafter referred to as the proximal ends 411) are spaced apart; that the second magnet 42 is buried in the rotating shaft 31 at a position between the first magnets 41; that the center of the second magnet 42 lies on the axis of mirror symmetry L1 and the two side of the second magnet 42 respectively separate from each of the first magnets 41; that the longitudinal axis L2 of the strip-like configuration of each first magnet 41 in a radial cross section of the rotating shaft 31 forms with the axis of mirror symmetry L1 an acute angle α facing the center of the rotating shaft 31; that the longitudinal axis L3 of the strip-like configuration of the second magnet 42 in the radial cross section of the rotating shaft 31 is perpendicular to the axis of mirror symmetry L1; that the length of the second magnet 42 is smaller than the length of each first magnet 41; and that the magnetic barrier spaces 43 are formed as holes, penetrate the rotating shaft 31 along the axial direction thereof, are each open at the two axial ends of the rotating shaft 31, are respectively adjacent to the ends of the first magnets 41 that are distant from the axis of mirror symmetry L1 along the respective longitudinal directions of the first magnets 41 (referred to herein as the distal ends 412), and are each located between the adjacent first magnet 41 and the outer periphery of the rotating shaft 31.

The rotor 30 extends inside the stator 20. The outer diameter of the rotating shaft 31 is smaller than the inner diameter of the stator body 21 such that an annular air gap is formed between the outer periphery of the rotating shaft 31 and the inner periphery of the stator body 21. In this embodiment, each magnet unit 40 extends across an angular range that corresponds to six stator slots 22; in other words, there are six times as many stator slots 22 as the magnet units 40. The number six, however, is provided for illustrative purposes only and is not intended to be a limitation of the present invention. For example, changing the number six to "six to ten" or other numbers is but a simple variation of the invention.

Figure 4A:
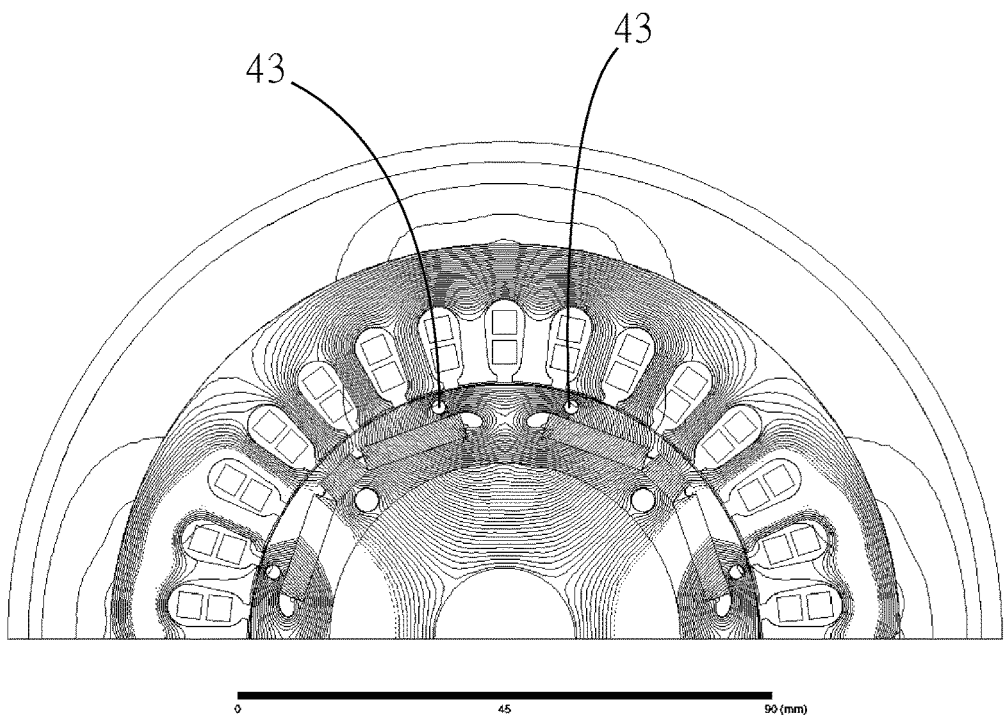
FIG. 4A shows the magnetic field lines of the preferred embodiment in FIG. 1.
Figure 4B:
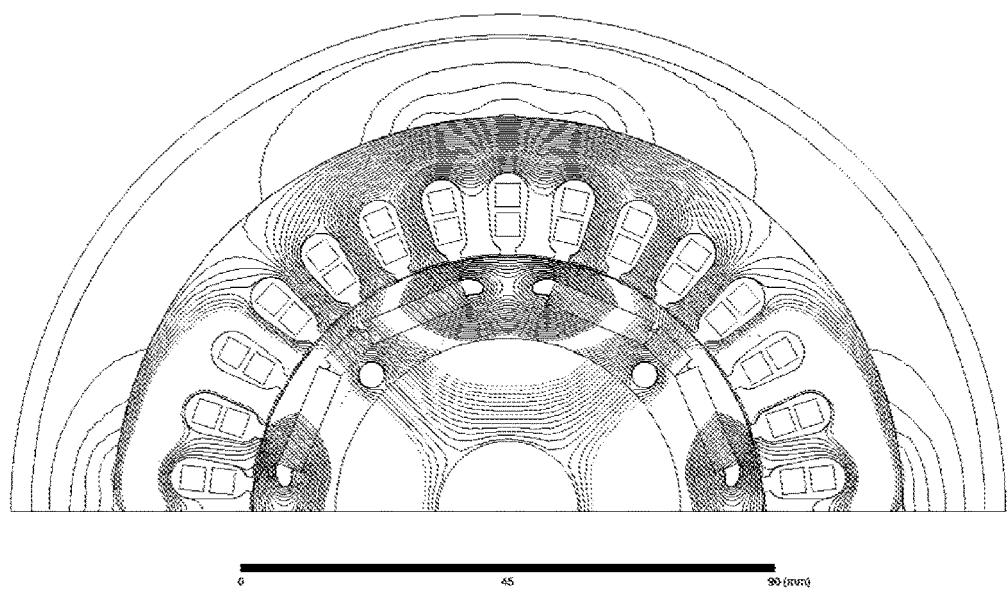
FIG. 4B shows the magnetic field lines of a conventional permanent-magnet motor for the sake of comparison.
Figure 5:
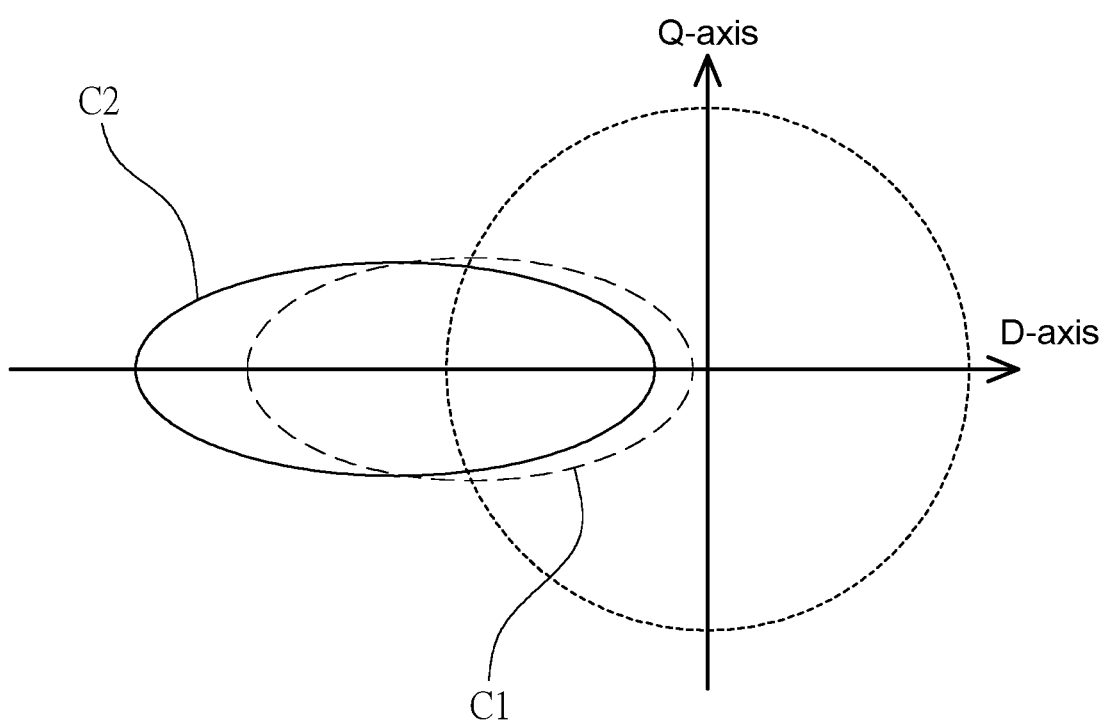
FIG. 5 is a circle diagram of the preferred embodiment in FIG. 1 and of the conventional permanent-magnet motor in FIG. 4B.

In terms of effect, one of the major technical features of the permanent-magnet spindle motor 10 is the effect those magnetic barrier spaces 43 have on magnetic flux, as demonstrated by FIG. 4A, which shows the magnetic field lines of the permanent-magnet spindle motor 10, and FIG. 4B, which shows the magnetic field lines of a conventional spindle motor without the magnetic barrier spaces (hereinafter referred to as the comparative spindle motor). The difference between the magnetic field lines in FIG. 4A and FIG. 4B shows that the permanent-magnet spindle motor 10 has a more concentrated magnetic flux and can therefore provide a larger torque and a higher rotation speed than the comparative spindle motor to meet the application requirements of the spindle to be driven. The circle diagram in FIG. 5 also shows that the CPSR C1 of the permanent-magnet spindle motor 10 is larger than the CPSR C2 of the comparative spindle motor in FIG. 4B, which indicates that the permanent-magnet spindle motor of the present invention is indeed capable of a larger torque and a higher rotation speed than achievable in the prior art. As the foregoing properties of the permanent-magnet spindle motor of the invention match the requirements of a machine tool spindle, the spindle motor is particularly suitable for driving such a spindle.

It should be pointed out that while the embodiment described above includes the second magnets in addition to the first magnets, the second magnets can be dispensed with when implementing the present invention. A permanent-magnet spindle motor having the aforesaid construction but lacking the second magnet in each magnet unit can produce substantially the same effect as when the second magnets are present. Furthermore, when the second magnet in each magnet unit is left out, the proximal ends of the two symmetric first magnets in each magnet unit can be brought closer to each other to make effective use of the limited volume of the rotating shaft.

What is claimed is:

1. A permanent-magnet spindle motor, comprising:
   a stator having an annular stator body and a plurality of stator slots provided in an inner periphery of the stator body;
   a rotor having a tubular rotating shaft extending coaxially inside the stator body, wherein the rotating shaft has an inner diameter larger than one half of an outer diameter of the rotating shaft; and
   a plurality of magnet units provided in the rotating shaft along a circumference of the rotating shaft, the number of the magnet units being smaller than the number of the stator slots, each magnet unit of the plurality of magnet units having two first magnets and two magnetic barrier spaces, wherein in each said magnet unit, each of the two first magnets has a strip-like configuration in a radial cross section of the rotating shaft, the two first magnets are buried in a rotating shaft mirror-symmetrically with respect to an axis of mirror symmetry defined by a diameter of the rotating shaft, a longitudinal axis of each of the two first magnets and the axis of mirror symmetry form an acute angle toward a center of the rotating shaft, and each of the two magnetic barrier spaces is formed as a hole, is located between an outer periphery of the rotating shaft and one of the two first magnets, is adjacent to a distal end of the one of the two first magnets with respect to the axis of mirror symmetry, penetrates the rotating shaft along an axial direction of the rotating shaft, and is open at two axial ends of the rotating shaft;
   wherein each said magnet unit of the plurality of magnet units includes a second magnet located between the two first magnets, the second magnet being positioned perpendicular to the axis of mirror symmetry of the rotor and each first magnet of the two first magnets being angled toward a central axis of the rotating shaft relative to the second magnet and being positioned at an angle that is less than 90 degrees from the axis of mirror symmetry of the rotor;
   wherein the plurality of magnet units being the second magnet located between the two first magnets form a circular cross section between the inner diameter and the outer diameter of the rotating shaft of the rotor.

2. The permanent-magnet spindle motor of claim 1, wherein in each said magnet unit, the second magnet is centered on the axis of mirror symmetry.

3. The permanent-magnet spindle motor of claim 2, wherein in each said magnet unit, the second magnet has two lateral sides spaced apart respectively from the two first magnets.

4. The permanent-magnet spindle motor of claim 2, wherein in each said magnet unit and in the radial cross section of the rotating shaft, the second magnet has a length smaller than a length of each of the two first magnets.

5. The permanent-magnet spindle motor of claim 2, wherein the rotor has a plurality of receiving spaces corresponding in number to the magnet units, and the receiving spaces are provided in the rotating shaft to receive the magnet units respectively.

6. The permanent-magnet spindle motor of claim 5, wherein each said receiving space is a single through hole penetrating the rotating shaft.

7. The permanent-magnet spindle motor of claim 1, wherein in each said magnet unit, the second magnet has two lateral sides spaced apart respectively from the two first magnets.

8. The permanent-magnet spindle motor of claim 1, wherein in each said magnet unit and in the radial cross section of the rotating shaft, the second magnet has a length smaller than a length of each of the two first magnets.

9. The permanent-magnet spindle motor of claim 1, wherein in each said magnet unit, the two first magnets are spaced apart.

10. The permanent-magnet spindle motor of claim 1, wherein the rotor has a plurality of receiving spaces corresponding in number to the magnet units, and the receiving spaces are provided in the rotating shaft to receive the magnet units respectively.

11. The permanent-magnet spindle motor of claim 10, wherein each said receiving space is a single through hole penetrating the rotating shaft.

12. The permanent-magnet spindle motor of claim 1, wherein the inner diameter of the rotating shaft is 0.6 to 0.8 times as large as the outer diameter of the rotating shaft.

13. The permanent-magnet spindle motor of claim 1, wherein the number of the stator slots is 6 to 10 times the number of the magnet units.

* * * * *